(12) United States Patent  
Lane (10) Patent No.: US 7,949,047 B2
(45) Date of Patent: May 24, 2011

(54) SYSTEM AND METHOD FOR PARTIAL INTRAFRAME ENCODING FOR WIRELESS MULTIMEDIA TRANSMISSION

(75) Inventor: Richard Doil Lane, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 10/785,767

(22) Filed: Feb. 23, 2004

(65) Prior Publication Data

US 2004/0184539 A1 Sep. 23, 2004

Related U.S. Application Data

(60) Provisional application No. 60/456,022, filed on Mar. 17, 2003.

(51) Int. Cl.
*H04N 7/12* (2006.01)

(52) U.S. Cl. ............ 375/240.12; 375/240.2; 375/240.03; 348/490

(58) Field of Classification Search ............. 375/240.01, 375/240.24, 240.27, 240.12, 240.2, 240.3; 348/469, 490

See application file for complete search history.

(56) References Cited

U.S. PATENT DOCUMENTS

| | | | |
|---|---|---|---|
| 4,947,248 A | | 8/1990 | Hienerwadel et al. |
| 5,191,436 A | * | 3/1993 | Yonemitsu ............ 386/52 |
| 5,897,219 A | * | 4/1999 | Yoo et al. ............ 386/111 |
| 6,222,924 B1 | * | 4/2001 | Salomaki ............ 380/200 |
| 6,259,736 B1 | | 7/2001 | Chujoh et al. |
| 7,046,910 B2 | | 5/2006 | Chen |
| 2003/0007559 A1 | * | 1/2003 | Lallet et al. ............ 375/240.03 |

FOREIGN PATENT DOCUMENTS

| | | |
|---|---|---|
| EP | 0336509 | 10/1989 |
| EP | 1133191 | 9/2001 |
| EP | 1263238 | 12/2002 |
| JP | 9214977 | 8/1997 |
| RU | 2128405 | 3/1999 |
| WO | 0160052 | 8/2001 |
| WO | 0215589 | 2/2002 |
| WO | 02058418 | 7/2002 |
| WO | WO02071639 | 9/2002 |

OTHER PUBLICATIONS

International Search Report PCT/US04/008284, International search authority US, Oct. 5, 2004.
International Preliminary Report on Patentability, PCT/US2004/008284—International Preliminary Examining Authority—US, Nov. 12, 2004.
Written Opinion, PCT/US2004/008284—International Search Authority—European Patent Office, Oct. 5, 2004.
Wenger, "Slice Interleaving: Simulation Results",Joint Video Team (JVT) of ISO/IEC MPEG & ITU-T VCEG (ISO/IEC JTC1/SC29/WG11 and ITU-T SG16 Q6), No. JVT-C091, May 10, 2002.

(Continued)

*Primary Examiner* — Temesghen Ghebretinsae
(74) *Attorney, Agent, or Firm* — Sandip S. Minhas; Nicholas A. Cole (57) ABSTRACT

Digital multimedia includes intraframe information and interframe information. In addition to sending separate complete intraframes that are referenced by interframes, some interframes ("hybrid" frames) contain partial intraframe information, so that if a complete intraframe is lost, referencing interframes can obtain at least some intraframe information from the hybrid frames.

29 Claims, 5 Drawing Sheets

OTHER PUBLICATIONS

Wenger, "Video Redundancy Coding in H.263+", Proceedings AVSPN, Jan. 1, 1997, p. 6.
Supplementary European Search Report—EP04757608—Berlin Patent Office—Jul. 2, 2009.
Wang et al., "Error Control and Concealment for Video Communication: a Review", Proceedings of the IEEE, IEEE., New York, US, vol. 86, No, 5, May 1, 1998.
Wang et al., "Error Resilient Video Coding Techniques Real-Time Video Communications Over Unreliable Networks", IEEE Signal Processing Magazine, IEEE Service Center, Piscataway, NJ, US1 Jul. 1, 2000, pp. 61-82.
Wang, "Error-Robust Video Coding Using Isolated Regions", Joint Video Team (JVT) of ISO/IEC MPEG & ITU-T VCEG (ISO/IEC JTC1/SC29/WG11 and ITU-T SG16 Q6), No. JVT-C073, May 10, 2002.
Wang, "Gradual Decoder Refresh Using Isolated Regions",Joint Video Team (JVT) of ISO/IEC MPEG & ITU-T VCEG (ISO/IEC JTC1/SC29/WG11 and ITU-T SG16 Q6), No. JVT-C074, May 10, 2002.
Wang, "Isolated Regions: Motivation, Prob's, and Sol'NS", Joint Video Team (JVT) of ISO/IEC MPEG & ITU-T VCEG (ISO/IEC JTC1/SC29/WG11 and ITU-T SG16 Q6), No. JVT-C072, May 10, 2002.
Wenger et al., Error Resilience Support in H.263+:, IEEE Transactions on Circuits and Systems for Video Technology, IEEE Service Center, Piscataway, NJ, US, vol. 8, No. 7, Nov. 1, 1998.
Wenger, "Flexible Macroblock Ordering (FMO) Proposal",Joint Video Team (JVT) of ISO/IEC MPEG & ITU-T VCEG (ISO/IEC JTC1/SC29/WG11 and ITU-T SG16 Q6), No. JVT-C089, May 10, 2002.
Horowitz, Scattered Slices Error Concealment:, Joint Video Team (JVT) of ISO/IEC MPEG & ITU-T VCEG (ISO/IEC JTC1/SC29/WG11 and ITU-T SG16 Q6), No. JVT-B027, Feb. 1, 2002.

* cited by examiner

SYSTEM AND METHOD FOR PARTIAL INTRAFRAME ENCODING FOR WIRELESS MULTIMEDIA TRANSMISSION

CROSS-REFERENCE TO RELATED APPLICATION

This application claims priority to U.S. Provisional Patent Application Ser. No. 60/456,022, filed Mar. 17, 2003, which is incorporated herein by reference in their entirety.

FIELD OF THE INVENTION

The present invention relates generally to computer-based communication systems.

BACKGROUND OF THE INVENTION

Digital multimedia data such as video and music can be transmitted wirelessly to mobile receivers, such as wireless telephones, for playing of the multimedia by users of the mobile receivers. Such data typically may be broadcast.

The multimedia can be formatted in accordance with Moving Pictures Expert Group (MPEG) standards such as MPEG-1, MPEG-2 (also used for DVD format), MPEG-4 and other block based transform codecs. Essentially, for individual video frames these multimedia standards use Joint Photographic Experts Group (JPEG) compression. In JPEG, the image of a single frame is typically divided into small blocks of pixels (usually 8×8 and/or 16×16 pixel blocks) that are encoded using a discrete cosine transform (DCT) function to transform the spatial intensity values represented by the pixels to spatial frequency values, roughly arranged, in a block, from lowest frequency to highest. Then, the DCT values are quantized, i.e., the information is reduced by grouping it into chunks by, e.g., dividing every value by 10 and rounding off to the nearest integer. Since the DCT function includes a progressive weighting that puts bigger numbers near the top left corner of a block and smaller numbers near the lower right corner, a special zigzag ordering of values can be applied that facilitates further compression by run-length coding (essentially, storing a count of the number of, e.g., zero values that appear consecutively, instead of storing all the zero values). If desired, the resulting numbers may be used to look up symbols from a table developed using Huffman coding to create shorter symbols for the most common numbers, an operation commonly referred to as "variable length coding". In any case, a JPEG-encoded stream represents horizontal lines of a picture, in much the same way as the underlying pixel data is arranged in a matrix of horizontal rows.

It will be appreciated that JPEG compression results in lost information. However, owing to the phenomenon of human perception and the way that the above process works, JPEG compression can reduce a picture to about one-fifth of its original size with virtually no discernable difference and to one-tenth of its original size with only slight degradation.

Motion pictures add a temporal dimension to the spatial dimension of single pictures. Typical motion pictures have thirty frames, i.e., thirty still pictures, per second of viewing time. MPEG is essentially a compression technique that uses motion estimation to further compress a video stream.

MPEG encoding breaks each picture into blocks called "macroblocks", and then searches neighboring pictures for similar blocks. If a match is found, instead of storing all of the DCT values for the entire block, the system stores a much smaller vector that describes the movement (or not) of the block between pictures. In this way, efficient compression is achieved.

With more specificity, MPEG compression in general uses three kinds of video frames. Naturally, some frames, referred to as "intraframes" (also referred to as "reference frames", or ?I frames? and "information frames"), in which the entire frame is composed of compressed, quantized DCT values, must be provided (e.g., around two per second). But in MPEG compression the remaining frames (e.g., 28) that make up the rest of the video for that second are very much smaller frames that refer to the intraframes, in accordance with MPEG compression principles. In MPEG parlance these frames are called "predicted" frames (?P frames?) and "bidirectional" frames (?B frames?), herein collectively referred to as "interframes".

Predicted frames are those frames that contain motion vector references to the preceding intraframe or to a preceding predicted frame, in accordance with the discussion above. If a block has changed slightly in intensity or color, then the difference between the two frames is also encoded in a predicted frame. Moreover, if something entirely new appears that does not match any previous blocks, then a new block or blocks can be stored in the predicted frame in the same way as in an intraframe. Note that, as used herein, such a new block is not a "predetermined portion" of an intraframe in that it arises only upon the random introduction of a new object of arbitrary size and position in the frame.

In contrast, a bidirectional frame is used as follows. The MPEG system searches forward and backward through the video stream to match blocks (typically one frame in each direction). Experience has shown that two bidirectional frames between each intraframe or predictive frame works well, so that a typical group of frames associated with a single intraframe might be: the full intraframe, followed by two bidirectional frames, followed by a predictive frame, followed by two bidirectional frames, another predictive frame, two more bidirectional frames, a predictive frame, two more bidirectional frames, a predictive frame, and finally two more bidirectional frames, at which point a new full intraframe might be placed in the stream to refresh the stream. In some instances, only intraframes and predictive frames are used, since bidirectional frames are computationally expensive to generate and they require more reference video frames be store in the decoder memory. The simplest encoders do not use any interframes at all, but only intraframes, dramatically sacrificing compression for simplicity but using the least amount of decoder memory.

The present invention, in contemplating the above principles, recognizes that MPEG compression works very well when transmitting a video stream over a reliable link (e.g., from a hard disk drive or DVD to a processor over a reliable TCP/IP network connection). The present invention has critically recognized, however, that in the context of "lossy" transmission paths such as might occur in wireless transmission, the loss of an intraframe more or less destroys the associated interframes and thus severely degrades the quality of service (QOS) provided, until the occurrence of the next full intraframe, particularly when a lost intraframe cannot be retransmitted (e.g., during broadcast transmission). This often requires the decoder to freeze the display until another valid intraframe is received. The ideal solution is to provide the compression obtained by using P and B frames with improved error resilience.

SUMMARY OF THE INVENTION

A multimedia data stream for wireless transmission of digital multimedia includes plural sets of frames, with each set typically including N hybrid frames (also referred to as H frames)$_i$. Each hybrid frame conveys a respective $i^{th}$ intraframe portion, along with interframe information. A full intraframe is established by the intraframe portions collectively. If desired, each set of frames may also include a full conventional intraframe and conventional interframes.

In another aspect, a communication system includes a processor that receives multimedia data and that partitions it into interframe information and intraframe information. N hybrid frames are established, with each frame having information representing at least one predetermined, typically cyclic, intraframe portion and at least some interframe information. The primary idea is to insert intraframe data that is not required in the normal construction of normal interframes also referred to as P and B frames. This additional intraframe data provides additional error resilience for video streams transmitted over a lossy transmission system.

In a preferred embodiment, the processor establishes all hybrid frames to have information representing M intraframe lines. When using traditional DCT motion estimation and compensation techniques, M preferably is an integer number of Macro blocks in height. A first preferred hybrid frame includes information representing a first M intraframe lines, a second hybrid frame includes information representing a second M intraframe lines, and so on. It is conceivable that the number of lines of intraframe data per hybrid frame could vary to accommodate different algorithms or weighting functions.

In non-limiting embodiments the multimedia data can be digital, and it can be broadcast using CDMA principles, GSM principles, or OFDM principles. The multimedia data can be broadcast on a unidirectional link, or it can also be transmitted on a two-way point-to-point link to wireless receivers.

In another aspect, a method for communicating, to wireless receivers, multimedia data that is characterized by intraframe information and interframe information includes conveying parts of intraframes in hybrid interframes, with the hybrid interframes being generated at predetermined intervals. In a non-limiting embodiment the part of the intraframe carried by a hybrid frame includes information representing quantized discrete cosine transforms (DCT) of pixel information. It is noted here that the method can be applied to transforms other than DCT block based transforms. The information representing quantized DCTs may be encoded using, e.g., run length coding.

In still another aspect, a wireless receiver for displaying multimedia data that is characterized by interframes and hybrid frames which convey cyclic portions of intraframe information includes means for using the interframes to reference the cyclic portions carried in the hybrid frames. The receiver also includes means for displaying multimedia at least in part using the cyclic portions.

In other embodiment, the predetermined intraframe data portions contained in the hybrid frames found between I frames do not have to combine to cover an entire video frame. Also, the total area covered by intraframe data contained in hybrid frames need not cover areas of the picture deemed less important. This determination can take the form of but is not limited to disregarding the corners, tops and bottoms or edges of the video frames. Moreover, the encoder can determine that a particular region of a sequence of pictures has more consistent motion than others and produce regular hybrid frames for error resilience purposes.

Accordingly, the spacing between hybrid frames in a video stream does not necessarily have to be equal or cyclic. By using H frames the spacing between full I frames can be increased and thus the total BW required for a desired QoS can be decreased.

With more specificity, the size and position of intraframe data can be centered around the middle of the picture and after an I frame each successive H frame can contain more intraframe data than the previous H frame until the final H frame's intraframe data actually covers almost and entire frame (i.e., almost an entire I frame). Also, the amount of intraframe data successive H frames between two I frames carry can vary if desired.

Fractional intraframes (also to be referred to as a F frames) can also be used to carry intraframe data. An F frame is similar to an H frame but does not contain the interframe data, instead carrying only partial intraframe data. The F frames do not necessarily have to be decoded if the receiving device determines that few enough errors had been seen for the region covered by the F frame since the last I frame or H Frame covering the same region of the picture.

In a system employing layering, H and/or F frames could be used on one or all layers. A likely implementation would be to include H and F frames on the Base layer(s) only.

The intraframe data in H and F frames need not be limited to rectangular shapes comprised by grouping horizontal lines. Different geometric shapes can be used to contain the intraframe data.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
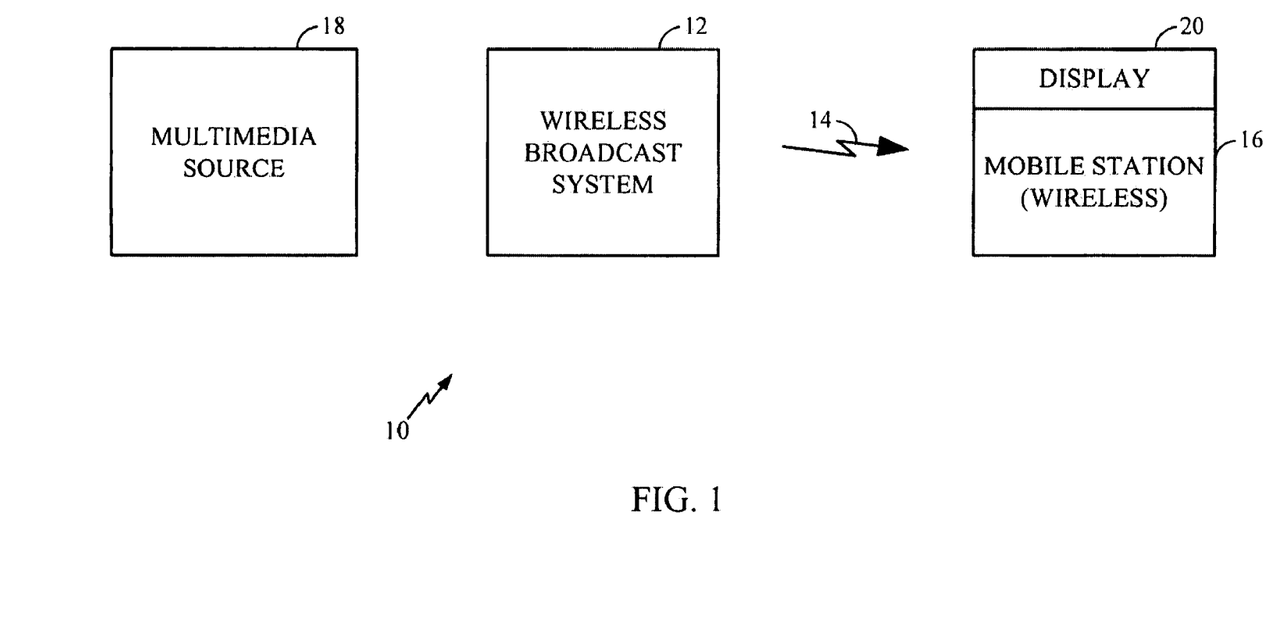
FIG. 1 is a block diagram of the present system.

Referring initially to FIG. 1, a system is shown, generally designated 10, that includes a wireless broadcast system 12 which wirelessly broadcasts, using a preferably unidirectional channel 14, digital multimedia content in the form of multimedia streams to wireless mobile stations 16 (only a single mobile station 16 shown for clarity). Both the broadcast system 12 and mobile stations 16 can include respective processors.

The multimedia streams can be from one or more sources 18 that communicate with or are otherwise associated with the broadcast system 12. The broadcast system 12 can use, without limitation, CDMA principles, GSM principles, or other wireless principles including wideband CDMA (WCDMA), cdma2000 (such as cdma2000 1× or 3× air interface standards, for example), TDMA, or TD-SCDMA, and OFDM. The multimedia content can alternatively be provided over a bidirectional point-to-point link if desired, such as, e.g., a Bluetooth link or a 802.11 link or a CDMA link or GSM link. In any case, the mobile station 16 can include an audio, video, or audio/video (A/V) display 20, for presenting the multimedia streams on the display 20.

Figure 2:
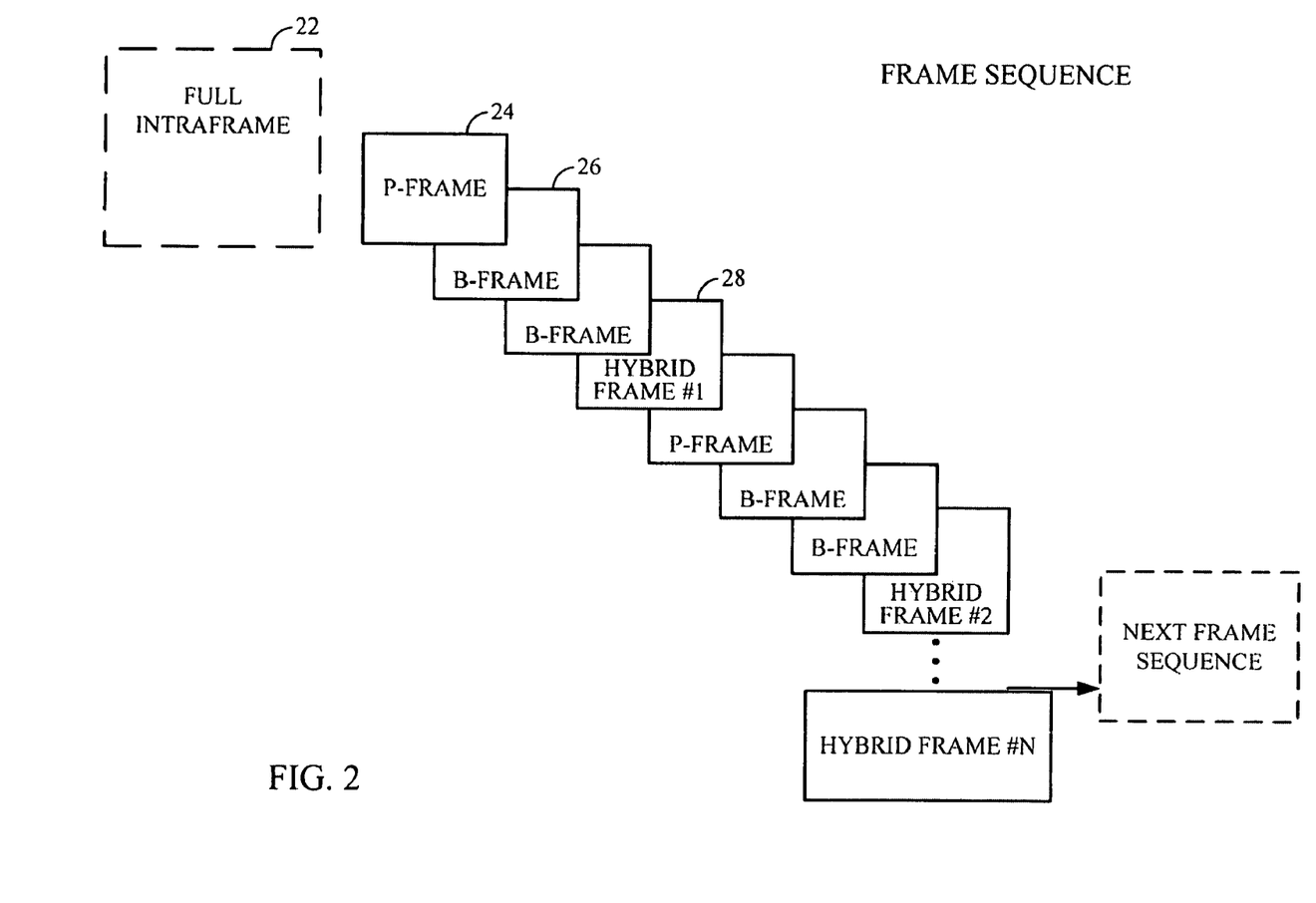
FIG. 2 is a schematic diagram of a frame group according to the present invention.

FIG. 2 schematically shows a single frame sequence, i.e., group or set of related frames, in accordance with the present invention. While FIGS. 2 and 3 illustrate frames graphically, in practice, of course, the transmitted multimedia stream is a stream of symbols that taken together represent the physical frames shown in FIGS. 2 and 3.

As shown in FIG. 2, a full intraframe 22 can be the initial frame of a set. However, the full intraframe 22 might be optional in some embodiments, owing to the subsequent intraframe information that is carried in the hybrid frames discussed further below. In any case, the preferred intraframe 22 is essentially a single complete JPEG-type DCT based or stand alone picture or reference frame. Accordingly, in accordance with principles set forth above, the intraframe 22 is substantially composed of symbols representing encoded quantized DCT values that in turn represent pixels of a video frame.

Sets of picture frames in a video sequence are grouped together for processing. This grouping is referred to as a GOP, or Group Of Pictures. Each GOP contains at least one intraframe (typically only one intraframe). The frames in a GOP may also include interframes, including predicted frames 24 and bidirectional frames 26. Also, in accordance with principles set forth further below, the frames in a single set of frames can include hybrid frames 28. Hybrid frames 28 essentially are like the interframes 24, 26 except that they contain predetermined portions of intraframe information.

Figure 3:
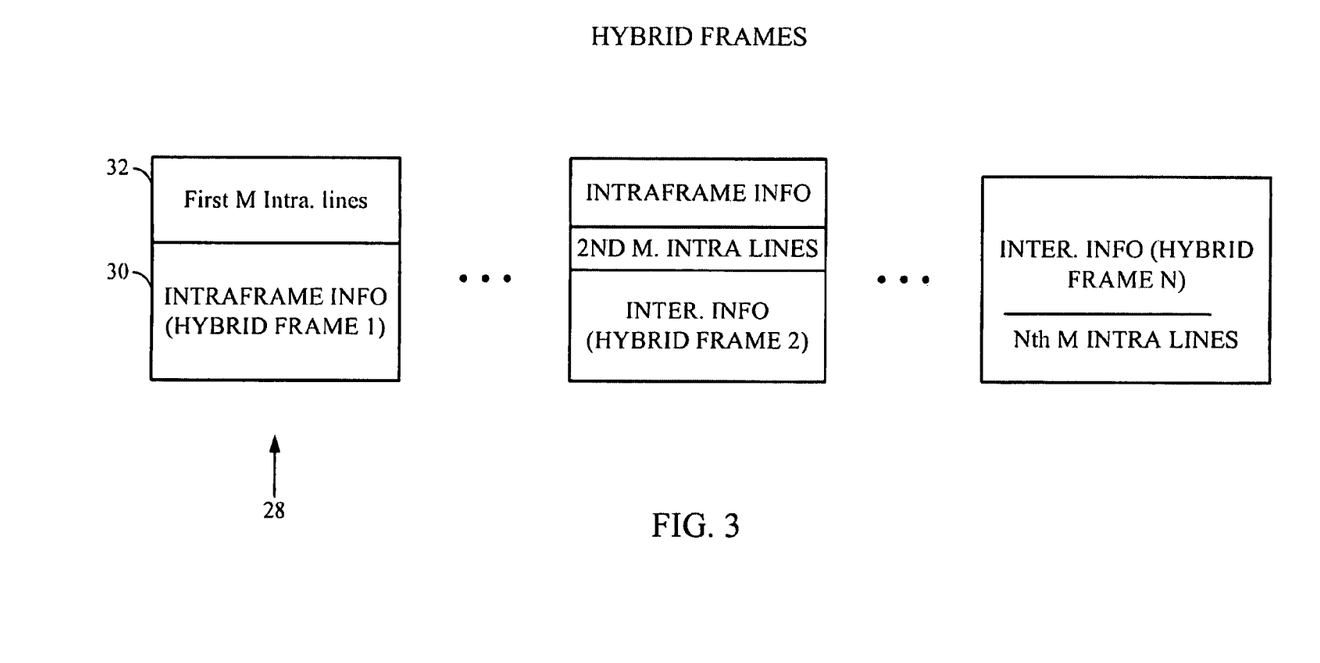
FIG. 3 is a schematic diagram of the hybrid frames of a group.

More specifically, as shown in FIG. 3, each hybrid frame 28 includes conventional interframe information 30 and intraframe information 32. The interframe information can include, e.g., vectors referencing blocks in other frames, while the intraframe information includes intraframe information representative of pixels, i.e., DCT-based values such as encoded quantized DCT values, or indeed other values, that represent spatial pixel intensity.

For the preferred embodiment, unlike a conventional interframe that might contain intraframe information related to a new object of arbitrary (from a programmatic view) time and location of appearance, hybrid frames 28 can include predetermined cyclic portions of intraframes. That is, the hybrid frames of a GOP successively contain intraframe information that represents geometrically successive intraframe regions. More specifically, the first hybrid frame 28 includes a first portion of an intraframe, the second hybrid frame in a GOP includes a second intraframe portion, preferably geometrically successive to the first intraframe portion, and so on, i.e., the $N^{th}$ hybrid frame in a GOP includes an $N^{th}$ intraframe portion. The portions may be information representing M lines of an intraframe, with all the intraframe portions in a group together making up a complete intraframe. Thus, when each intraframe portion is M lines of intraframe information, N*M=total number of lines in a single intraframe. The intraframe portions of the hybrid frames in a set, while representing predetermined, distinct geometric regions of an intraframe, may or may not represent or be derived from a single JPEG image. In other embodiments the intraframe portions of hybrid frames need not represent a complete frame. In addition, alternative shapes could be used to contain the intraframe data such as vertical bars, circles, squares, etc.

Instead of lines of an image, the intraframe portions may be frequency bands for audio, objects or types of objects for video, text, etc.

The above-mentioned fractional intraframe (F-frame) is essentially identical to the any of the hybrid frames shown in FIG. 3, except that it does not contain the interframe information portions 30, but rather only the partial intraframe portion 32.

Figure 4:
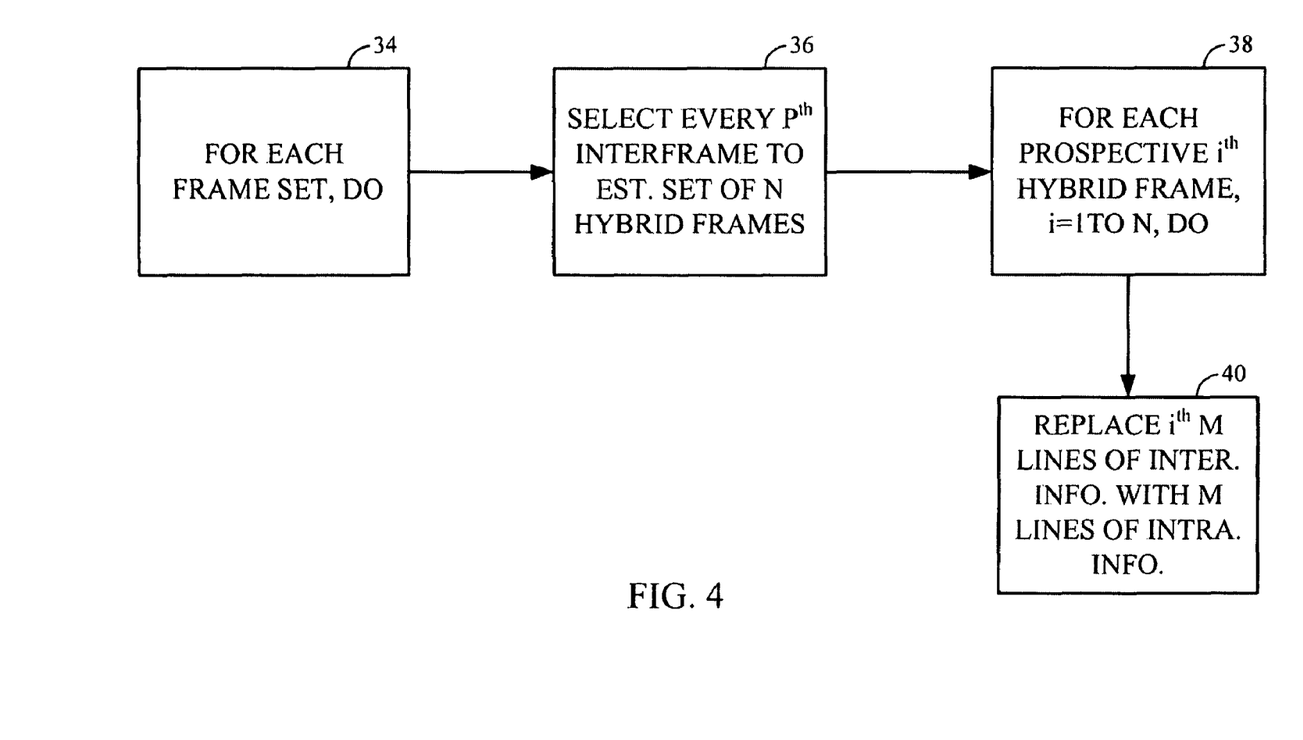
FIG. 4 is a flow chart of the present process for generating hybrid frames.

FIG. 4 shows the logic illustrated in the schematic diagrams of FIGS. 2 and 3. Block 34 represents the beginning of a DO loop that is entered for each GOP, it being understood that the frames have been partitioned into groups each of which can include one or more full intraframes and plural interframes in accordance with MPEG principles. After processing, a GOP would include one complete intraframe, followed by conventional interframes and hybrid frames. For example, a GOP might include ten conventional interframes and five hybrid frames each of which conveys a unique one-fifth portion of an intraframe, and perhaps one initial, complete intraframe. The conventional interframes can refer to the intraframe portions of the hybrid frames, regardless of whether a full intraframe is provided, or, if a full intraframe is provided, the interframes might refer to it and refer to the hybrid frames only in the event that the full intraframe is lost.

Also for the preferred embodiment, moving to block 36, every $P^{th}$ interframe may be selected as a prospective hybrid frame. A total of N interframes are selected. Thus, in the above example, every third interframe of fifteen total would be selected (P=3) such that (N=5) hybrid frames are generated. The value of "P" may vary from one to ten or even more. Indeed, the value of "P" may vary within a single multimedia stream, depending on, e.g., degree of motion, etc.

The choices of P and N do not necessarily have to multiply to equal the length of the GOP or the length of the GOP-1. If the system desires greater error resilience, the hybrid frames would be placed closer together. Conversely, if less error resilience is required, the hybrid frames could be spaced farther apart. Note that the distance between intraframes would likely change along with the distance between the hybrid frames.

Proceeding to block 38, for each $i^{th}$ prospective hybrid frame, i=1, 2, . . . , N, the logic loops to block 40 to render the frame into a hybrid frame by replacing the $i^{th}$ interframe information portion that simply refers to a 1/N portion of an intraframe with intraframe information representing an $i^{th}$ 1/N portion of an intraframe. In the case of dividing the intraframe portions into M lines each, references to a first M intraframe lines in the first hybrid frame are replaced with the first M lines of an intraframe, references to a second M intraframe lines in the second hybrid frame are replaced with the second M lines of an intraframe, and so on. It is likely that M would be chosen to be a multiple of the Macro block height which is often set to 16 lines. While FIG. 4 indicates that actual interframe references are "replaced" by intraframe portions, it is to be understood that a hybrid frame could be generated "from the ground up", i.e., by creating a new frame that initially has an $i^{th}$ 1/N portion of an intraframe with the remainder of the frame conveying interframe information. In any case, the preferred system results in each hybrid frame containing a cyclic portion of an intraframe, with each $i^{th}$ cyclic portion representing an $i^{th}$ intraframe region that is geometrically contiguous to the $(i-1)^{th}$ region represented by the $(i-1)^{th}$ cyclic portion of the $(i-1)^{th}$ hybrid frame, and to the (i'region that is represented by the $(i+1)^{th}$ cyclic portion of the $(i+1)^{th}$ hybrid frame.

In other embodiments, the shapes and sizes of the intraframe data in the hybrid frames does not have to be equal or cover the entire picture frame size or be separated by regular intervals. For example, if there was a region of the picture of high interest or regular high motion, the hybrid frame could provide additional intraframe data regardless of whether or not any intraframe data in actually required for error correction.

The mobile stations 16 receive the multimedia stream and decode the information therein, including the hybrid frames, with the mobile stations 16 using the interframes to reference, selectively or otherwise, the intraframe portions carried in the hybrid frames for display of the multimedia. The processors in the mobile stations 16 may be used for this purpose.

It may now be appreciated that if the loss of an entire intraframe occurs, only the interframes that precede hybrid frames are completely useless. Interframes following hybrid frames can refer at least to the $i^{th}$ intraframe portions in those hybrid frames, and thus provide some measurable QOS.

While the particular System And Method For Partial Intraframe Encoding Or Wireless Multimedia Transmission as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. '112, sixth paragraph, unless the element is expressly recited using the phrase "means for" or, in the case of a method claim, the element is recited as a "step" instead of an "act".

Figure 5:
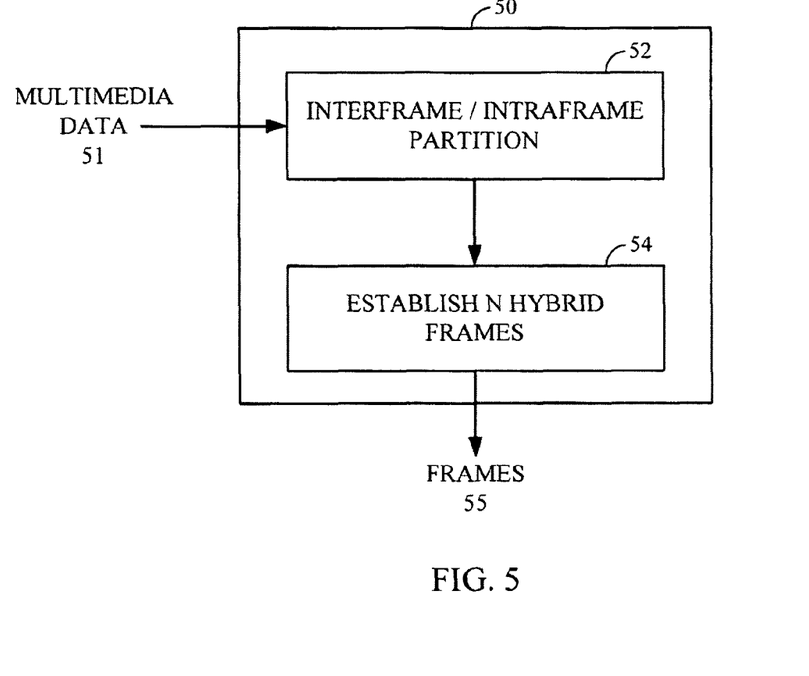
FIG. 5 depicts a block diagram of another aspect of the present invention.

FIG. 5 depicts a block diagram of another aspect of the present invention. In FIG. 5, a processor 50 is shown receiving multimedia data 51. In block 52, the processor 50 partitions the multimedia data into interframe information and intraframe information. In block 54, the processor 50 establish N hybrid frames 55, with each frame having information representing at least one predetermined intraframe portion and at least some interframe information.

What is claimed is:

1. A communication system, comprising:
   a processor receiving multimedia data comprising a plurality of pictures and undertaking logic comprising:
   partitioning the multimedia data into interframe information and intraframe information, the intraframe information being partitioned into one or more predetermined portions; and
   establishing N hybrid frames, wherein each of the N hybrid frames includes information representing at least one of the one or more predetermined intraframe portions and at least some interframe information, and wherein a first amount of intraframe information in at least one of the N hybrid frames is different than a second amount of intraframe information in at least one other of the N hybrid frames.

2. The system of claim 1, wherein each of the N hybrid frames encodes a different one of the pictures.

3. The system of claim 2, wherein a first hybrid frame includes information representing a first M intraframe lines, wherein a second hybrid frame includes information representing a second M intraframe lines.

4. The system of claim 1, wherein the multimedia data is partitioned based on objects in the data.

5. The system of claim 1, wherein a first hybrid frame contains a first intraframe information portion having a size and shape and a second hybrid frame includes a second intraframe information portion having a size and shape, at least one of: the size, and the shape, of the first intraframe portion being different than the corresponding size and shape of the second intraframe portion.

6. The system of claim 1, wherein the multimedia data is digital.

7. The system of claim 1, wherein the multimedia data is broadcast using at least one of: CDMA principles, GSM principles, and OFDM principles.

8. The system of claim 1, wherein the multimedia data is broadcast on a unidirectional link.

9. The system of claim 1, wherein the multimedia data is transmitted on a two-way point-to-point link.

10. The system of claim 1, further comprising at least one wireless receiver receiving the multimedia data.

11. A method, comprising:
    receiving multimedia data comprising a plurality of pictures;
    partitioning the multimedia data into interframe information and intraframe information, the intraframe information being partitioned into one or more predetermined portions; and
    establishing N hybrid frames, wherein each of the N hybrid frames includes at least information representing at least one of the one or more predetermined intraframe portions and at least some interframe information, and wherein a first amount of intraframe information in at least one of the N hybrid frames is different than a second amount of intraframe information in at least one other of the N hybrid frames.

12. The method of claim 11, wherein each of the N hybrid frames encodes a different one of the pictures.

13. The method of claim 12, wherein a first hybrid frame includes information representing a first M intraframe lines, and wherein a second hybrid frame includes information representing a second M intraframe lines.

14. The method of claim 11, wherein the multimedia data is partitioned based on objects in the data.

15. The method of claim 11, wherein a first hybrid frame contains a first intraframe information portion having a size and shape and a second hybrid frame includes a second intraframe information portion having a size and shape, at least one of: the size, and the shape, of the first intraframe portion being different than the corresponding size and shape of the second intraframe portion.

16. The method of claim 11, wherein the multimedia data is digital.

17. The method of claim 11, wherein the multimedia data is broadcast using at least one of: CDMA principles, GSM principles, and OFDM principles.

18. The method of claim 11, wherein the multimedia data is broadcast on a unidirectional link.

19. The method of claim 11, wherein the multimedia data is transmitted on a two-way point-to-point link.

20. The method of claim 11, further comprising receiving the multimedia data.

21. A wireless receiver for receiving multimedia data comprising a plurality of pictures, comprising:
 means for partitioning the multimedia data into interframe information and intraframe information, the intraframe information being partitioned into one or more predetermined portions; and
 means for establishing N hybrid frames, wherein each of the N hybrid frames includes at least information representing at least one of the one or more predetermined intraframe portions and at least some interframe information, and wherein a first amount of intraframe information in at least one of the N hybrid frames is different than a second amount of intraframe information in at least one other of the N hybrid frames.

22. The wireless receiver of claim 21, wherein each of the N hybrid frames encodes a different one of the pictures.

23. The wireless receiver of claim 22, wherein a first hybrid frame includes information representing a first M intraframe lines, and wherein a second hybrid frame includes information representing a second M intraframe lines.

24. The wireless receiver of claim 21, wherein the multimedia data is partitioned based on objects in the data.

25. The wireless receiver of claim 21, wherein a first hybrid frame contains a first intraframe information portion having a size and shape and a second hybrid frame includes a second intraframe information portion having a size and shape, at least one of: the size, and the shape, of the first intraframe portion being different than the corresponding size and shape of the second intraframe portion.

26. The wireless receiver of claim 21, wherein the multimedia data is digital.

27. The wireless receiver of claim 21, wherein the multimedia data is broadcast using at least one of: CDMA principles, GSM principles, and OFDM principles.

28. The wireless receiver of claim 21, wherein the multimedia data is broadcast on a unidirectional link.

29. The wireless receiver of claim 21, wherein the multimedia data is transmitted on a two-way point-to-point link.

* * * * *